(12) United States Patent
Sebire

(10) Patent No.: US 10,070,355 B2
(45) Date of Patent: Sep. 4, 2018

(54) REPORTING IN A COMMUNICATION SYSTEM

(75) Inventor: Benoist Pierre Sebire, Tokyo (JP)

(73) Assignee: Nokia Solutions and Networks Oy, Espoo (FI)

(*) Notice: Subject to any disclaimer, the term of this patent is extended or adjusted under 35 U.S.C. 154(b) by 343 days.

(21) Appl. No.: 14/006,734

(22) PCT Filed: Apr. 7, 2011

(86) PCT No.: PCT/EP2011/055439
§ 371 (c)(1),
(2), (4) Date: Sep. 23, 2013

(87) PCT Pub. No.: WO2012/136263
PCT Pub. Date: Oct. 11, 2012

(65) Prior Publication Data
US 2014/0010205 A1    Jan. 9, 2014

(51) Int. Cl.
*H04W 36/14* (2009.01)
*H04W 36/00* (2009.01)

(52) U.S. Cl.
CPC ....... *H04W 36/14* (2013.01); *H04W 36/0083* (2013.01)

(58) Field of Classification Search
CPC .................... H04W 36/14; H04W 36/0083
USPC .... 370/310, 328, 329, 331, 351, 389, 395.1, 370/395.2, 395.3, 395.31; 455/403, 455/422.1, 436, 438, 439, 440
See application file for complete search history.

(56) References Cited

U.S. PATENT DOCUMENTS

| | | | |
|---|---|---|---|
| 2008/0039087 A1 | 2/2008 | Gallagher et al. | 455/435.2 |
| 2008/0233875 A1 | 9/2008 | Desai et al. | 455/41.2 |
| 2012/0207038 A1* | 8/2012 | Choi | H04W 16/14 370/252 |
| 2012/0207040 A1* | 8/2012 | Comsa | H04W 72/1215 370/252 |
| 2012/0213162 A1* | 8/2012 | Koo | H04W 16/14 370/329 |

FOREIGN PATENT DOCUMENTS

WO    WO 2008/066435 A1    6/2008

* cited by examiner

*Primary Examiner* — Obaidul Huq
(74) *Attorney, Agent, or Firm* — Harrington & Smith

(57) ABSTRACT

Methods and apparatuses for signalling and use of information regarding coexisting radios is disclosed. In the method is it determined whether there is a change in information regarding the coexisting radios because of a handover of the device, and selectively signaling information regarding the coexisting radios from the device based on the determination. A target station can selectively provide control on the device such that if the target station receives information regarding the coexisting radios from the device the control is provided based on said received information, and if the target station does not receive information regarding the coexisting radios from the device the control is provided based on information provided earlier by the device to a source station.

16 Claims, 4 Drawing Sheets

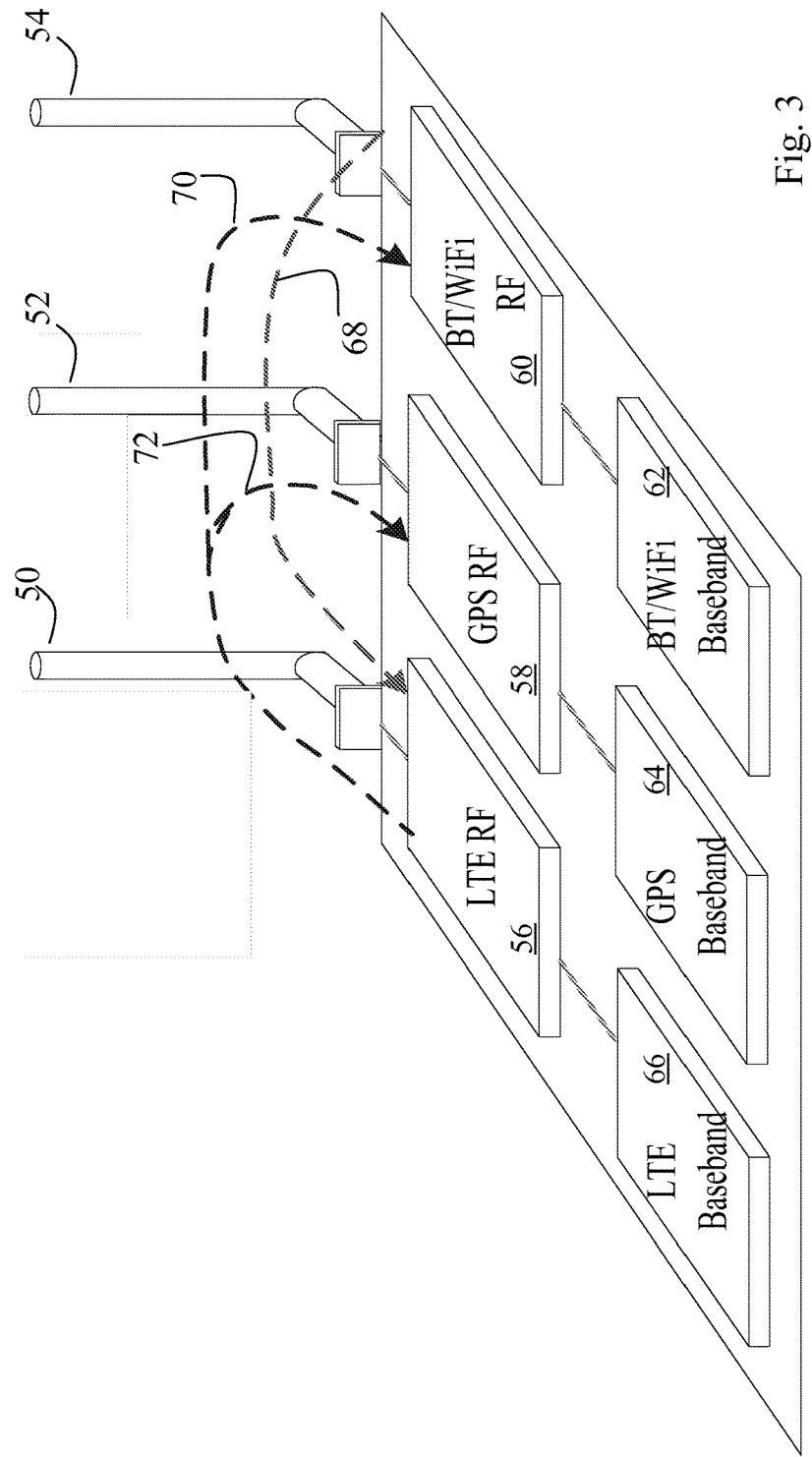

REPORTING IN A COMMUNICATION SYSTEM

TECHNICAL FIELD

This disclosure relates to controlling wireless communications by a device, and more particularly to reporting in association with handovers of a device provided with coexisting radios.

BACKGROUND

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. In a wireless communication system at least a part of the communication between at least two stations occurs over a wireless interface between at least two stations. Examples of wireless systems include public land mobile networks (PLMN) such as cellular networks, satellite based communication systems and different wireless local networks, for example wireless local area networks (WLAN). A wireless radio connection can also be provide by short range radio, for example based on the Buetooth™ radio.

An example of wireless communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

Communications in a communication system can be between appropriate communication devices. In wireless systems a communication device provides a transceiver station that can communicate with another communication device such as e.g. base stations of access networks and/or other user equipments. A communication device of a user is often referred to as user equipment (UE) or terminal. A communication device is provided with an appropriate signal receiving and transmitting arrangement for enabling communication of data and signalling with other parties.

A communication device can be provided with a multiple of radios in order to allow users to access various networks and services ubiquitously. For example, a mobile device can be equipped with multiple radio transceivers. In accordance with a more particular example a mobile device may be equipped with a cellular radio (e.g. LTE), a wireless local area network (e.g. WiFi™), and a short range radio (e.g. Bluetooth™) transceivers, and global navigation satellite system (GNSS) receivers. This can cause problems in view of interference, and more particularly, coexistence interference between the collocated radio transceivers. In-device coexistence interference can occur for example when transmitting in one frequency band interferes with receiving in another, within the same user equipment.

SUMMARY

A serving base station can be used to mitigate the effect of the coexistence interference. One of the proposals for avoidance of in-device coexistence interference in relation to the LTE is for the user equipment to signal information to the radio access network based on which the base station can then decide when transmission/reception or other radio signal would benefit or no longer benefit from not using certain carriers or frequency resources.

A more particular proposal is known as a Frequency Domain Multiplexing (FDM) Solution. In accordance with this solution an Industrial, Scientific and Medical (ISM) radio signal is led away from LTE frequency band in frequency domain. Another proposal, known as a time domain multiplexing (TDM) solution, can also be used for avoidance of in-device coexistence interference. In the TDM scheduled and unscheduled periods are alternated on the problematic frequencies to ensure that transmission of signal to do coincide with reception of another signal. In here scheduling or scheduled period can be understood as a period during which a LTE user equipment may be scheduled to transmit or receive, and correspondingly unscheduled period refers to a period during which the LTE user equipment is not scheduled to transmit or receive, thereby allowing the industrial, scientific and medical (ISM) band radio to operate without interference.

To provide control, the LTE access system relies on information signalled from the user equipment. For the FDM solution, the user equipment can indicate which frequencies are unusable due to in-device coexistence. In response to such a signalling, an LTE eNB can typically order the user equipment to perform a handover to a frequency that has not been reported by the user equipment as suffering from in-device coexistence interference. For the TDM solution, the user equipment can signal a suggested pattern to the radio access system of the LTE. Based on such information, the final TDM patterns (i.e. scheduling and unscheduled periods) are configured by the radio access system.

In the following description, the information reported by the user equipment to assist the access system in both the FDM and TDM solutions will be referred to as in-device coexistence (IDC) information.

Signalling of IDC information can cause signalling overhead on the uplink. In particular, substantial overhead may be caused in systems where the IDC information shall always be sent from a mobile device when it is in handover.

Embodiments of the invention aim to address one or several of the above issues. It is noted that the above discusses only examples, and the issues are not limited to any particular communication system, standard, specification, radios and so forth, but may occur in any communication device and/or system where in-device coexistence interference may occur.

In accordance with an embodiment there is provided a method of signalling by a device with coexisting radios, comprising determining whether there is a change in information regarding the coexisting radios because of a handover of the device, and selectively signaling information regarding the coexisting radios from the device based on the determination.

In accordance with another embodiment there is provided a method of controlling a device with coexisting radios, comprising determining that the device is in handover between a source station and a target station, and selectively providing control on the device such that if the target station receives information regarding the coexisting radios of the device from the device the control is provided based on said information received from the device, and if the target station does not receive information regarding the coexisting radios of the device from the device the control is provided based on information regarding the coexisting radios of the device provided earlier by the device to the source station.

In accordance with another embodiment there is provided an apparatus for control of signalling by a device with coexisting radios, the apparatus comprising at least one processor, and at least one memory including computer program code, wherein the at least one memory and the computer program code are configured, with the at least one processor, to determine whether there is a change in information regarding the coexisting radios because of a handover of the device, and selectively cause signaling of information regarding the coexisting radios from the device based on the determination.

In accordance with yet another embodiment there is provided an apparatus for a station capable of providing control on a device with coexisting radios in handover between a source station and a target station, the apparatus comprising at least one processor, and at least one memory including computer program code, wherein the at least one memory and the computer program code are configured, with the at least one processor, to selectively provide control on the device such that if the target station receives information regarding the coexisting radios of the device from the device the control is provided based on said information received from the device, and if the target station does not receive information regarding the coexisting radios of the device from the device the control is provided based on information regarding the coexisting radios of the device provided earlier by the device to the source station.

In accordance with a more detailed embodiment it can be determined that information regarding the coexisting radios to be signaled in handover of the device would be the same as signaled previously. The device can then, in response, abstain from signaling information regarding the coexisting radios.

Instructions whether the signalling of information regarding coexisting radios shall take place for all handovers or only when a change in said information is determined can be communicated to the device, and the device operated accordingly.

Usability of a radio resource in a service area of a target station can be determined. The determining can be based at least in part on in-device interference. The information may comprise in-device coexistence report. Information regarding the coexisting radios may be always signaled in radio link failure recovery.

A communication device and/or base station comprising a control apparatus configured to provide at least one of the embodiments can also be provided. The communication device may comprise a multi-radio user equipment.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

BRIEF DESCRIPTION OF THE DRAWINGS

The invention will now be described in further detail, by way of example only, with reference to the following examples and accompanying drawings, in which:

FIG. 3 shows an example of a multi-radio communication device;

DETAILED DESCRIPTION

In the following certain exemplifying embodiments are explained with reference to a wireless or mobile communication system serving mobile communication devices. Therefore, before explaining in detail the exemplifying embodiments, certain general principles of a wireless communication system, components thereof, and mobile communication devices are briefly explained with reference to FIGS. 1 to 4 to assist in understanding the technology underlying the described examples.

Figure 1:
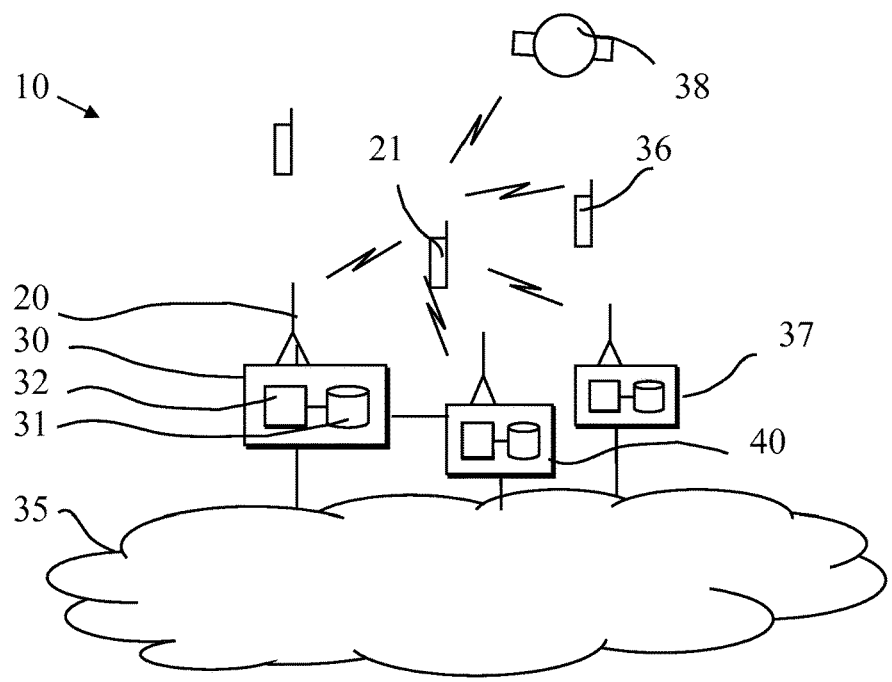
FIG. 1 shows an example of a communication system wherein below described examples of the invention may be implemented.

A mobile communication device 21 is typically provided wireless access via at least one base station or similar wireless transceiver node of an access system. An access system may be provided by a cell of a cellular system or another radio service system enabling a communication device to access a communication system. In FIG. 1 base stations 20 and 40 provide each a radio service area or a cell of a cellular system. However, it is noted that a great number of radio service areas may be provided in a communication system and that a mobile communication device may simultaneously be located in a plurality of cellular service areas. Also, the base station sites 20 and 40 can provide more than one cell and/or a plurality of sectors, for example three radio sectors, each sector providing a cell or a sub radio service area of a cell.

A base station is typically controlled by at least one appropriate controller so as to enable operation thereof and management of mobile communication devices 21 in communication with the base station. The control apparatus can be interconnected with other control entities. In FIG. 1 a control apparatus of base station 20 is shown to be provided by block 30. A base station control apparatus is typically provided with memory capacity 31 and at least one data processor 32. The control apparatus and functions may be distributed between a plurality of control units.

A non-limiting example of communication systems is the long-term evolution (LTE) of the Universal Mobile Telecommunications System (UMTS) that is standardized by the 3rd Generation Partnership Project (3GPP). A LTE base station is known as NodeB (NB) in the vocabulary of the 3GPP specifications. LTE based systems can employ a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio services providing a mobile device with access to a communication system include those provided by base stations of systems that are based on technologies such as wireless local area network (WLAN) and/or WiMax (Worldwide Interoperability for Microwave Access). Base station 37 is shown as an example of a local area networks. WLANs are sometimes referred to by WiFi™, a trademark that is owned by the Wi-Fi Alliance, a trade association promoting Wireless LAN technology and certifying products conforming to certain standards of interoperability.

In FIG. 1 example the base stations 20, 37 and 40 are connected to a wider communications network 35. A controller may be provided for coordinating the operation of the access systems. A gateway function may also be provided to connect to another network via the network 35. The other network may be any appropriate network. A wider communication system may thus be provided by one or more interconnect networks and the elements thereof, and one or more gateways may be provided for interconnecting various networks. Base stations 20 and 40 can be connected. The connection between the base stations may involve intermediate nodes of one or more cellular networks.

The mobile communication device 21 may further communicate with for example another mobile device 36. This communication may be provided by means of a short range link, for example, by means of Bluetooth™ connectivity. FIG. 1 also shows a satellite 38 with which the mobile device 21 may receive and/or receive and transmit radio signals. The satellite may be a satellite of a positioning system or a satellite based communication system.

Figure 2:
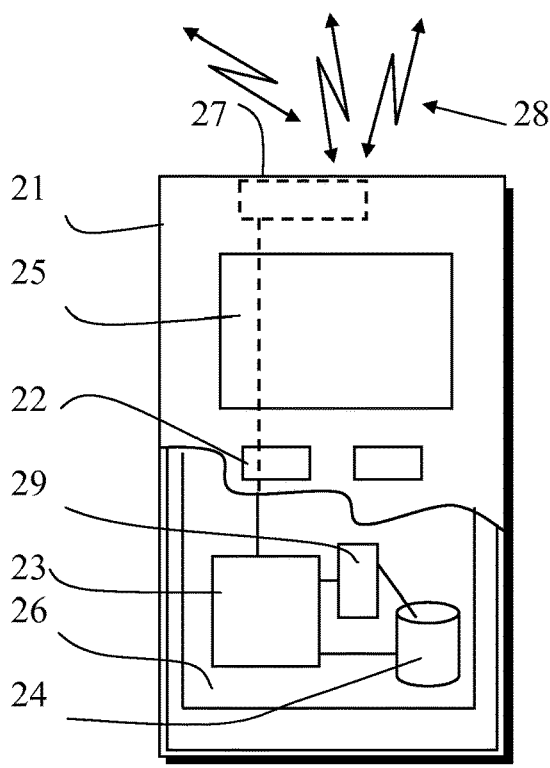
FIG. 2 shows an example of a communication device.

FIG. 2 shows a schematic, partially sectioned view of a communication device 21 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A mobile device is typically provided with at least one data processing entity 23, at least one memory 24 and other possible components 29 for use in software and hardware aided execution of tasks it is designed to perform, including control of access to and communications with base stations and other communication devices. The data processing, storage and other relevant control apparatus can be provided on an appropriate circuit board and/or in chipsets. This feature is denoted by reference 26. Control and memory functions provided by the control apparatus of the mobile device to cause control of signalling operations in accordance with certain embodiments of the present invention will be described later in this description.

The user may control the operation of the mobile device by means of a suitable user interface such as key pad 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The mobile device 21 may receive and transmit signals 28 via appropriate apparatus for receiving and transmitting signals. In FIG. 2 transceiver apparatus is designated schematically by block 27. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system. A more detailed example of possible radio components is shown in FIG. 3.

In order to allow users to access various networks and services ubiquitously, a user equipment can be equipped with multiple radio transceivers. However, this can cause interference, and more particularly, coexistence interference between those collocated radio transceivers. In-device coexistence interference can occur for example when transmitting in one frequency band interferes with receiving in another, within the same user equipment. FIG. 3 shows an example of coexistence interference in a multi-radio device.

Due to the proximity of multiple radio transceivers within the same device, the transmit power of one transmitter may be much higher than the received power level of another receiver. By means of filter technologies and sufficient frequency separation, the transmit signal may not result in significant interference. But for some coexistence scenarios, e.g. when different radio technologies operating on adjacent frequencies are used within the same user equipment, the state-of-the-art filter technology may not always provide sufficient interference rejection. Therefore, it may not be possible to solve the interference problem by a single generic radio frequency (RF) design may not always be possible.

In the example of FIG. 3, a device 21 has a first antenna 50, a second antenna 52 and a third antenna 54. The first antenna 50 is configured to transmit and receive LTE signals. The second antenna 52 is configured to receive GPS (global positioning system) signals. The third antenna 54 is configured to transmit and receive Bluetooth™ and/or Wi-Fi™ signals. The first antenna 50 is connected to an LTE radio frequency processor 56 which is arranged to process the radio frequency signals. The LTE radio frequency processor 56 is coupled to an LTE baseband processor 66 which is arranged to process the radio frequency signals to convert those signals to the baseband and to process those signals. Similarly, the second antenna 52 is coupled to a GPS radio frequency processor 58, which is arranged to be coupled to the GPS baseband processor 64. Finally, the third antenna 54 is connected to a Bluetooth™/Wi-Fi™ radio frequency processor 60 which in turn is connected to the Bluetooth™/Wi-Fi™ baseband processor 62. It should be appreciated that when the respective antenna receives a radio frequency signal, that radio frequency signal is provided to the respective radio frequency processor. The radio frequency processor may carry out any suitable processes, for example, filtering the desired signal from the undesired signals and/or amplification. The processed radio frequency signal is then provided to the respective baseband processor for down-conversion to the baseband and further processing. In the case of transmission, the baseband processors will receive the signals at the baseband and up-convert those signals to the radio frequency. Other processing may be carried out by the baseband processors. Those radio frequency signals are then passed to the respective radio frequency processor.

The processing carried out by the respective blocks can be performed by a single block or processor, or by more than two blocks or processors. The division of the processes between the blocks can of course be changed. For example, the RF processing block may, for example, in some embodiments perform the baseband conversion, at least one of converting down to the baseband or up-converting to the radio frequency. Separate processors and/or antennas may be provided in some embodiments for uplink and downlink. In some embodiments, at least one processor may be used for two or more different types of signal received from and/or to be transmitted by two or more antennas. It should be appreciated that in some embodiments, the GPS blocks may only need to receive signals.

It is possible that when LTE and Industrial, Scientific and Medical (ISM; this can include technologies such as the Bluetooth™ and WLAN) radio capabilities are provided in a single device, the LTE and ISM radio within the same device may be working on adjacent frequencies. For example, the LTE may be working on the upper part of band 40 (2300-2400 MHz) and the ISM may be working in the example 2450 MHz band. This type of coexistence may cause interference. This interference between the different frequencies is schematically shown in FIG. 3 by arrowed dashed lines 68 and 70.

Figure 4:
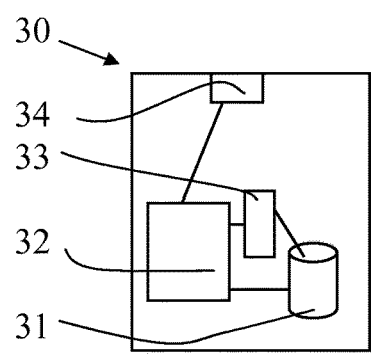
FIG. 4 shows an example of controller apparatus for a base station.

FIG. 4 shows an example of a control apparatus 30 for a communication system, for example to be coupled to and/or for controlling a station of a radio service area, for example one of the base stations 20, 40 or 37 of FIG. 1. The control apparatus 30 can be arranged to process and/or control signalling by mobile communication devices a service area of a station. The control apparatus 30 can be configured to provide control functions in association with communication of information regarding handovers and/or interference reports, in particular in-device coexistence reports. The control apparatus can control use of different modes of operation and/or switch between the modes and for coordination of communications in accordance with certain embodiments described below. For providing the control the control apparatus 30 comprises at least one memory 31, at least one data processing unit 32, 33 and an input/output interface 34. Via the interface the control apparatus can be coupled to receiver and transmitter apparatus of a base station. The control apparatus 30 can be configured to execute an appropriate software code to provide the control functions.

A mobile device can be handed over from a source base station to a target base station. In the case of LTE, for example, the handover would be between a source and target eNB. For example, the mobile device 21 of FIG. 1 may roam from the service area of base station 20 into the service area of base station 40. Other examples of triggering a handover include measurements by the mobile device, load determinations, interference and so on. The process of handover and reasons triggering handover as such are known, and thus do not require any more detailed explanation. Instead of the handover procedure itself, the herein described embodiments relate to information that may be provided for the new, or target base station to assist it in controlling subsequent communications by the handed over mobile device.

Figure 5:
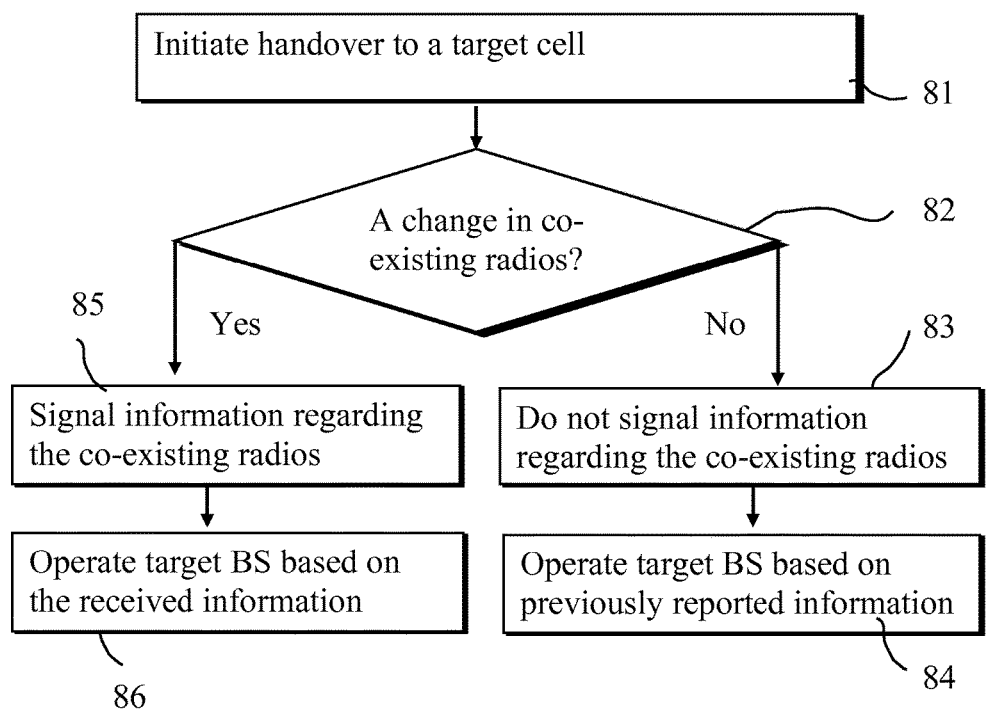
FIGS. 5, 6 and 7 are flowcharts illustrating certain embodiments.

After it has been determined that a handover is to be performed, the mobile device can start preparing for the handover. This is illustrated by step 81 in FIG. 5. In accordance with an embodiment for signalling information during handover of a device with coexisting radios, it is determined at 82 by the device whether any changes would need to be reported. For example, the device can determine usability of radio resources in the new service area and/or if any changes in view of use of radio resources would be needed in because of interference caused by the coexisting radios. According to a non-limiting example, a mobile device may determine that in the previous access area the LTE, Bluetooth™ and/or WiFi™ and/or GPS radios were able to be simultaneously active in the device, but that they would no longer be able to coexist in the target access area without causing excessive interference. Another example of a possible determined change is that a radio resource can become available in the target cell that was not available in the source cell. According to a further non-limiting example a handover command is received from a source base station ordering the device to move to a frequency where interference issues will occur.

If no change in the information that would be reported in view of the coexisting radios is determined at 82 the device can proceed to 83 and refrain from signalling information regarding the coexisting radios to the target base station. The target base station is then operated at 84 based on information that had been previously reported by the device. The information can have been reported to the source base station, and the source base station can thus provide this previously reported information. For example, the information can be provided in the exchange of information between the source and target stations during handover preparation.

If a change in the information that is anticipated to be signalled regarding any of the coexisting radios is determined at 82, information regarding the coexisting radios can be signalled to the target base station in response at 85. The target base station is then operated at 86 based on the received fresh information.

Figure 6:
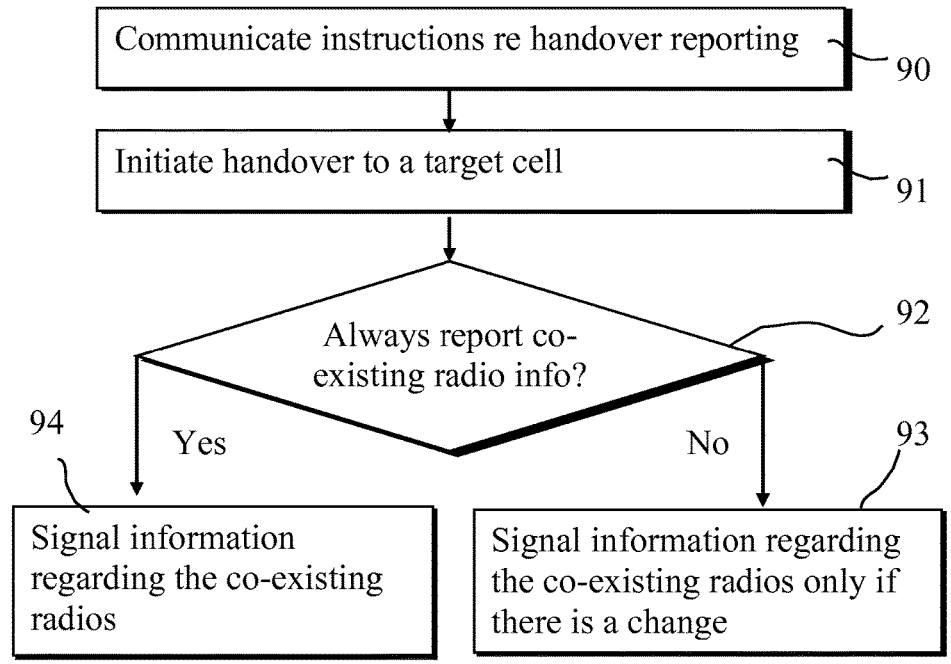

According to an embodiment instructions can be communicated to the device whether the signalling of information regarding coexisting radios shall take place at all handovers or only when a change in the information to be signalled is determined. This is illustrated by step 90 in FIG. 6. After handover is initiated at 91, it can be determined at 92 if forced reporting is in use or not. The device can be operated accordingly at the handover, e.g. be in an 'always reporting' mode at 94 or in a report only if changes determined mode at 93.

Figure 7:
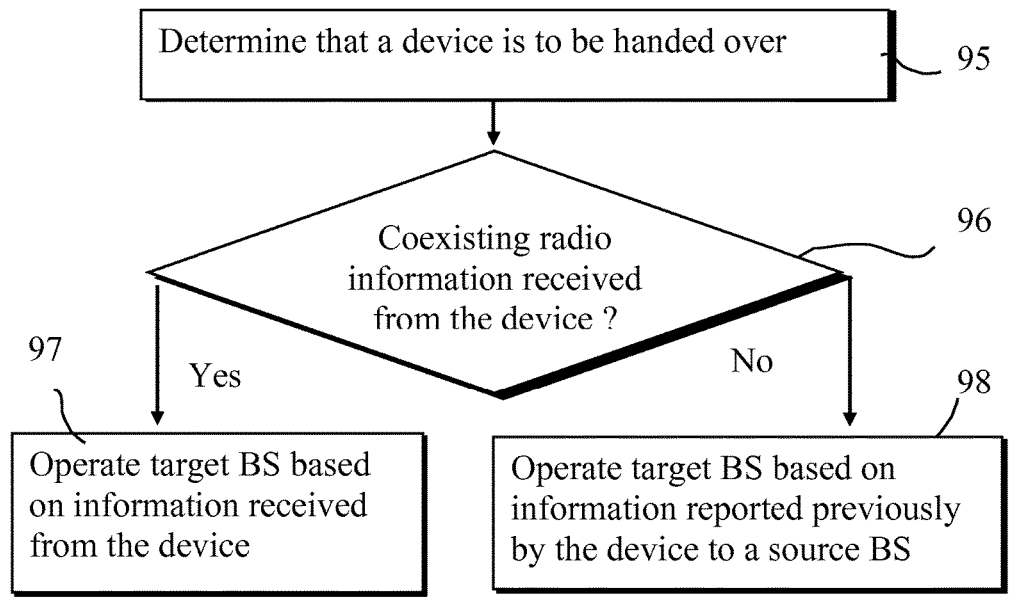

FIG. 7 shows a signalling flow chart for a possible operation at a target base station for controlling a device with coexisting radios. The target base station can determine at 95 that the device is in handover. The base target station can monitor at 96 if information regarding the coexisting radios of the device is received during or after handover. The target station can operate according to the previous information received from the source station during handover preparation as long as no new information is received.

If fresh information is received from the device, the state of the coexisting radios is determined at 97 based on the information received from the device and the device is controlled accordingly. In the absence of information from the device regarding the coexisting radios of the device information provided earlier by the device to the source base station is used in providing control on the device. The source base station can communicate the previously reported information to the target base station e.g. when preparing for the handover.

In accordance with a more specific example, in-device coexistence (IDC) can be reported by a user equipment at handover to a target base station, for example as eNB. In-device coexistence (IDC) information can also be exchanged between a source and the target base station during handover preparation phase. According to an embodiment in order to limit the impact on uplink overhead by this signalling the user equipment does not report any in-device coexistence (IDC) information after entering a target cell at handover as long as there is no change in the IDC information. To provide this, the user equipment may determine that if IDC information were to be sent, this information, or a predefined element(s) of the information, would be the same as the IDC information it has already sent previously. Thus, after moving to the target cell, the user equipment may be configured to report the IDC information only if the report would contain new information compared to what has already been signalled in earlier cell(s).

In accordance with a further embodiment a predefined time limit may be set for monitoring at the target base station if coexistence information is received. If no information is received by the end of the period, form the device or from the source base station, a request for the information is sent. The target base station can, for example, request the source base station to transport all or at least a part of the information for a user equipment it has detected as being at handover and which has not signalled the information itself.

According to an embodiment a handover command sent to a user equipment controls whether IDC information report is to be sent by the user equipment in the target cell or not after a handover has triggered. The reporting can be switched to a 'forced' mode, where the information is signalled regardless of whether the content of the report is new or not. The user equipment may only signal information that changes at the handover.

In accordance with an embodiment a user equipment can be configured to always signal IDC information at radio link failure (RLF) recovery.

The various embodiment above can be provided as alternatives or as complementary solutions.

Control may be provided by the access system based on the coexistence information, for example, in view of frequency domain multiplexing (FDM) and/or time domain multiplexing (TDM).

The required data processing apparatus and functions of a base station apparatus, a communication device and any other appropriate station or element may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations when to communicate and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to communications system such as those based on the LTE systems and 3GPP based systems, similar principles can be applied to other communication systems and channels where in-device interference may occur. For example, this may be the case in applications where no fixed station equipment is provided but a communication system is provided by means of a plurality of user equipment, for example in adhoc networks. Also, the above principles can also be used in networks where relay nodes are employed for relaying transmissions between stations. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method comprising:
   signalling by a user equipment with coexisting radios, comprising:
   determining whether there will be a change in at least one of availability of the coexisting radios and interference between the coexisting radios of the user equipment because of a handover of the user equipment between a source station and a target station;
   wherein based on determining that there will be the change, selectively signaling in-device coexistence information from the user equipment regarding the coexisting radios of the user equipment to the target station, the in-device coexistence information used to at least control subsequent communication operations at the target station for the handover of the user equipment, and
   wherein based on determining that there will be no change then the in-device coexistence information is not selectively signaled by the user equipment to the target station, and based on the in-device coexistence information not being signaled by the user equipment to the target station, information regarding the coexisting radios of the user equipment provided earlier is used to at least control subsequent communication operations at the target station for the handover of the user equipment.

2. The method as claimed in claim 1, comprising determining that in-device coexistence information regarding the coexisting radios to be signaled in the handover of the user equipment would be the same as signaled previously, and in response thereto abstaining from signaling in-device coexistence information regarding the coexisting radios to the target station, wherein the abstaining results in-device coexistence information provided earlier by the user equipment being used to at least control the subsequent communication operations at the target station for the handover of the user equipment.

3. The method as claimed in claim 1, comprising receiving instructions that the signalling of in-device coexistence information regarding coexisting radios shall take place for all handovers or only when a change in said information is determined; and
operating the user equipment accordingly.

4. The method as claimed in claim 1, wherein the determining comprises determining usability of a radio resource in a service area of the target station.

5. The method as claimed in claim 4, wherein the determining is based at least in part on in-device interference in the service area of the target station.

6. The method as claimed in claim 1, comprising always signalling said in-device coexistence information regarding the coexisting radios in radio link failure recovery.

7. The method as claimed in claim 1, comprising signalling only information that changes at the handover.

8. A non-transitory memory embodying a computer program comprising program code the computer program code executed by at least one processor to perform the method of claim 1.

9. The method of claim 1, wherein the in-device coexistence information is for use to at least control a usability of radio resources between the target station and the user equipment for the handover of the user equipment.

10. A method comprising:
controlling, by a target station, a user equipment with coexisting radios, comprising
determining that the user equipment is in handover between a source station and the target station; and
selectively providing control on the user equipment such that
if the target station receives in-device coexistence information regarding the coexisting radios of the user equipment from the user equipment the control is provided based on said in-device coexistence information received from the user equipment, wherein said in-device coexistence information is received in response to a determined change in at least one of availability of the coexisting radios and interference between the coexisting radios because of the handover of the device, and wherein the in-device coexistence information is for use to at least control subsequent communication operations at the target station for the handover of the user equipment; and
if the target station does not receive information regarding the coexisting radios of the user equipment from the user equipment the control is provided based on in-device coexistence information regarding the coexisting radios of the user equipment provided earlier by the user equipment to the source station.

11. The method as claimed in claim 10, comprising sending instructions to the user equipment whether the signalling of information regarding coexisting radios shall take place at all handovers or only when a change in the information is determined.

12. An apparatus comprising:
at least one processor, and
at least one memory including computer program code, wherein the at least one memory and the computer program code are configured, with the at least one processor, to cause the apparatus to:
control of signalling by a user equipment with coexisting radios comprising to
determine whether there a change in at least one of availability of the coexisting radios of the user equipment and interference between the coexisting radios because of a handover of the user equipment,
wherein based on determining that there will be a change, selectively cause signaling of in-device coexistence information regarding the coexisting radios of the user equipment from the user equipment to a target station, wherein the in-device coexistence information signaled from the user equipment is used to at least control subsequent communication operations at the target station for the handover of the user equipment, and
wherein based on determining that there will be no change then the in-device coexistence information regarding the coexisting radios of the user equipment is not selectively signaled by the user equipment to the target station, and based on the in-device coexistence information not being signaled by the user equipment to the target station, information regarding the coexisting radios of the user equipment provided earlier is used to at least control subsequent communication operations at the target station for the handover of the user equipment.

13. The apparatus as claimed in claim 12, wherein the information comprises an in-device coexistence report.

14. An apparatus comprising:
at least one processor, and
at least one memory including computer program code, wherein the at least one memory and the computer program code are configured, with the at least one processor, to cause the apparatus to:
for a station capable of providing control on a user equipment with coexisting radios and in handover between a source station and a target station, selectively provide control on the user equipment such that
if the target station receives in-device coexistence information regarding the coexisting radios of the user equipment from the user equipment the control is provided based on said in-device coexistence information received from the user equipment, wherein said in-device coexistence information is received in response to a determined change in at least one of availability of the coexisting radios and interference between the coexisting radios because of the handover of the user equipment, and wherein the in-device coexistence information is for use to at least control subsequent communication operations at the target station for the handover of the user equipment; and
if the target station does not receive information regarding the coexisting radios of the user equipment from the user equipment the control is provided based on in-device coexistence information regarding the coexisting radios of the user equipment provided earlier by the user equipment to the source station.

15. A device of a communication system comprising:
at least one processor, and
at least one memory including computer program code, wherein the at least one memory and the computer program code are configured, with the at least one processor, to cause the device to:
control of signalling by a user equipment with coexisting radios comprising the user equipment is caused to
determine whether there will be a change in at least one of availability of the coexisting radios of a user equipment and interference between the coexisting radios because of a handover of the user equipment;

wherein based on determining there will be the change, selectively signaling in-device coexistence information regarding the coexisting radios from the user equipment to a target station, wherein the in-device coexistence information signaled from the user equipment is used to at least control subsequent communication operations at the target station for the handover of the user equipment, and wherein based on determining that there will be no change then the in-device coexistence information regarding the coexisting radios of the user equipment is not selectively signaled by the user equipment to the target station, and based on the in-device coexistence information not being signaled by the user equipment to the target station, information regarding the coexisting radios of the user equipment provided earlier is used to at least control subsequent communication operations at the target station for the handover of the user equipment.

16. The device as claimed in claim 15 embodied in a base station or a user equipment.

\* \* \* \* \*